United States Patent
Wynn et al.

(10) Patent No.: US 11,699,820 B2
(45) Date of Patent: Jul. 11, 2023

(54) BATTERY MODULE WITH BIMETALLIC TERMINAL BUSBAR AND ADAPTABLE CONNECTOR INTERFACE

(71) Applicant: Rivian IP Holdings, LLC, Plymouth, MI (US)

(72) Inventors: Nathaniel C. Wynn, Tustin, CA (US); Kyle Butterfield, Rancho Santa Margarita, CA (US); Tyler Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 403 days.

(21) Appl. No.: 16/680,418

(22) Filed: Nov. 11, 2019

(65) Prior Publication Data

US 2020/0152936 A1 May 14, 2020

Related U.S. Application Data (60) Provisional application No. 62/760,808, filed on Nov. 13, 2018.

(51) Int. Cl.
*H01M 10/647* (2014.01)
*H01M 50/50* (2021.01)
(Continued)

(52) U.S. Cl.
CPC ....... *H01M 10/647* (2015.04); *H01M 50/204* (2021.01); *H01M 50/50* (2021.01);
(Continued)

(58) Field of Classification Search
CPC ............. H01M 10/613; H01M 10/625; H01M 10/647; H01M 10/6554; H01M 50/20;
(Continued)

(56) References Cited

U.S. PATENT DOCUMENTS

2009/0297892 A1* 12/2009 Ijaz ................... H01M 50/213
429/7
2010/0124693 A1* 5/2010 Kosugi ............... H01M 10/482
429/92

(Continued)

FOREIGN PATENT DOCUMENTS

CN 102057519 A 5/2011
CN 102456908 A 5/2012
(Continued)

OTHER PUBLICATIONS

PCT International Search Report for International Application No. PCT/US2019/060801, dated Mar. 17, 2020 (14 pages).

*Primary Examiner* — Lingwen R Zeng
(74) *Attorney, Agent, or Firm* — Haley Guiliano LLP (57) ABSTRACT

A battery module is provided. The battery module comprises a plurality of battery cells. Each battery cell comprises a first electrical terminal and a second electrical terminal. The battery module further comprises at least one bi-metallic busbar, e.g., at least one first busbar. The at least one first busbar comprises a metallic part, e.g., a first aluminum part, electrically coupled to the first electrical terminals of a first group of the plurality of battery cells. The first busbar further comprises another metallic part, e.g., a first copper part. The first copper part comprises a first interface part electrically coupled to the first aluminum part. The first copper part comprises a first terminal part configured to be electrically coupled to a conductor external to the battery module.

22 Claims, 6 Drawing Sheets

(51) Int. Cl.
*H01M 50/204* (2021.01)
*H01M 50/514* (2021.01)
*H01M 50/503* (2021.01)
*H01M 50/522* (2021.01)
*H01M 10/6554* (2014.01)
*H01M 10/613* (2014.01)
*H01M 10/625* (2014.01)
*H01M 50/543* (2021.01)
*H01M 50/20* (2021.01)

(52) U.S. Cl.
CPC ....... *H01M 50/503* (2021.01); *H01M 50/514* (2021.01); *H01M 50/522* (2021.01); *H01M 10/613* (2015.04); *H01M 10/625* (2015.04); *H01M 10/6554* (2015.04); *H01M 50/20* (2021.01); *H01M 50/543* (2021.01); *Y02E 60/10* (2013.01)

(58) Field of Classification Search
CPC .. H01M 50/50; H01M 50/502; H01M 50/543; H01M 50/204; H01M 50/503; H01M 50/514; H01M 50/522; Y02E 60/10
See application file for complete search history.

(56) References Cited

U.S. PATENT DOCUMENTS

| | | | | |
|---|---|---|---|---|
| 2012/0100399 | A1* | 4/2012 | Adachi | H01M 10/46 |
| | | | | 429/7 |
| 2012/0308849 | A1* | 12/2012 | Tortstensson | H01M 10/425 |
| | | | | 429/7 |
| 2018/0175466 | A1 | 6/2018 | Seo | |

FOREIGN PATENT DOCUMENTS

| | | |
|---|---|---|
| CN | 205911352 | 1/2017 |
| CN | 106654138 A | 5/2017 |
| CN | 107004815 A | 8/2017 |
| EP | 3166158 | 5/2017 |
| WO | 2013/051012 A2 | 4/2013 |

* cited by examiner

BATTERY MODULE WITH BIMETALLIC TERMINAL BUSBAR AND ADAPTABLE CONNECTOR INTERFACE

CROSS REFERENCE TO RELATED APPLICATION

This disclosure claims the benefit of U.S. Provisional Application No. 62/760,808, filed Nov. 13, 2018, which is hereby incorporated by reference herein in its entirety.

SUMMARY

Battery cells are often packaged into battery modules that include multiple battery cells and busbars. Busbars are commonly made of copper or aluminum. For a given ampacity value (maximum current capacity), an aluminum busbar will be approximately 50% less weight, 60% additional cross section, and 25% of the base material cost relative to copper. Aluminum has higher conductance by mass, whereas copper has higher conductance by volume, and aluminum is generally cheaper in cost than copper. Aluminum may be advantageous for particular components in battery modules because it may be easier than copper to fuse, weld, or otherwise attach to other components. Copper is advantageous for space-constrained components because it has a higher ampacity than aluminum for a given cross-section area. It would be advantageous to provide a bimetallic busbar assembly for a battery module that uses both copper and aluminum and leverages the advantages of both materials.

In some embodiments, a bi-metallic busbar is provided. The bi-metallic busbar comprises a first part formed from a first metallic material, e.g., aluminum. The first part is configured to be electrically coupled to at least one electrical terminal, e.g., a plurality of battery cell terminals of a battery module for an electric vehicle. The bi-metallic busbar further comprises a second part formed from a second metallic material, e.g., copper, which is different from the first metallic material. The second part is configured to be electrically coupled to a conductor, e.g., a conductor of an electric vehicle component. The first part and the second part are electrically coupled, e.g., at an interface part, to enable transfer of current between the at least one electrical terminal and the conductor.

In some embodiments, a battery module is provided. The battery module comprises a plurality of battery cells. Each battery cell comprises a first electrical terminal and a second electrical terminal. The battery module further comprises at least one bi-metallic busbar, e.g., at least one first busbar. The at least one first busbar comprises a metallic part, e.g., a first aluminum part, electrically coupled to the first electrical terminals of a first group of the plurality of battery cells. The first busbar further comprises another metallic part, e.g., a first copper part. The first copper part comprises a first interface part electrically coupled to the first aluminum part. The first copper part comprises a first terminal part configured to be electrically coupled to a conductor external to the battery module.

In some embodiments, the battery module may further comprise at least one other bi-metallic busbar, e.g., at least one second busbar. In some embodiments, the second busbar comprises a metallic part, e.g., a second aluminum part, electrically coupled to the second electrical terminals of a second group of the plurality of battery cells. In some embodiments, the second busbar further comprises another metallic part, e.g., a second copper part. The second copper part may comprise a second interface part electrically coupled to the second aluminum part. The second copper part may comprise a second terminal part configured to be electrically coupled to another conductor external to the battery module.

In some embodiments, the first terminal part comprises an electrical high side of the battery module. In some embodiments, the second terminal part comprises an electrical low side of the battery module.

In some embodiments, the first terminal part is electrically coupled to a first conductor external to the battery module. In some embodiments, the second terminal part is electrically coupled to a second conductor external to the battery module.

In some embodiments, the battery module comprises a generally rectangular prismatic shape comprising a top surface, a side surface, and an edge where the top surface meets the side surface. In some embodiments, the first aluminum part comprises a first dimension that is proximate to the edge and generally extends in a first direction parallel to the edge of the battery module. In some embodiments, the first aluminum part comprises a second dimension that generally extends in a second direction perpendicular to the first direction in a plane that is parallel to the top surface of the battery module. In some embodiments, when a load is electrically coupled to the battery module, current passes through the second dimension of the first aluminum part in a direction generally perpendicular to the edge of the battery module, e.g., in a direction perpendicular to the side surface of the battery module in an assembled configuration. In some embodiments, the first terminal part comprises a dimension generally perpendicular to the top surface of the battery module. In some embodiments, when a load is electrically coupled to the battery module, current passes through the dimension of the first terminal part in a direction generally perpendicular to the top surface of the battery module.

In some embodiments, the second dimension of the first aluminum part comprises a one or more extending elements that each generally extend in the second direction. In some embodiments, when a load is electrically coupled to the battery module, current passes through the plurality of extending elements in the direction generally perpendicular to the edge of the battery module, e.g., in a direction perpendicular to the side surface of the battery module in an assembled configuration.

In some embodiments, the first aluminum part further comprises a third dimension that extends at least partially along the side surface of the battery module in a direction perpendicular to the first dimension of the first aluminum part.

In some embodiments, the first copper part further comprises a dimension that extends at least partially along the side surface of the battery module in a direction perpendicular to the first dimension of the first aluminum part.

In some embodiments, the first copper part further comprises a first extension comprising a dimension generally perpendicular to the side surface and connected to the first terminal part.

In some embodiments, the first aluminum part comprises an aluminum strip. In some embodiments, the first interface part comprises a copper strip with access windows through which the aluminum strip and the plurality of extending elements are configured to be electrically coupled.

In some embodiments, the aluminum strip and the plurality of extending elements are electrically coupled by laser welding.

In some embodiments, the first aluminum part is connected to the first copper part with a bolted joint.

In some embodiments, the first aluminum part is connected to the first copper part by laser welding, ultrasonic welding, or brazing.

In some embodiments, each of the plurality of battery cells is coupled to a cooling plate, e.g., at an end of the cell.

In some embodiments, the disclosure is directed to a method of manufacturing a battery module, e.g., a battery module for an electric vehicle. The method comprises providing a plurality of battery cells, wherein each battery cell comprises a first electrical terminal and a second electrical terminal. The method comprises providing a bi-metallic busbar, e.g., a first busbar. The first busbar comprises a metallic part, e.g., first aluminum part, and another metallic part, e.g., a first copper part. The first copper part comprises a first interface part and a first terminal part. The first terminal part is configured to be electrically coupled to a conductor external to the battery module. The method comprises electrically coupling the first aluminum part to the first electrical terminals of a first group of the plurality of battery cells. The method comprises electrically coupling the first interface part to the first aluminum part.

In some embodiments, the method further comprises providing another bi-metallic busbar, e.g., a second busbar. In some embodiments the second busbar comprises a metallic part, e.g., a second aluminum part, and another metallic part, e.g., a second copper part. In some embodiments, the second copper part comprises a second interface part and a second terminal part configured to be electrically coupled to another conductor external to the battery module. In some embodiments, the method comprises electrically coupling the second aluminum part to the second electrical terminals of a second group of the plurality of battery cells. In some embodiments, the method comprises electrically coupling the second interface part to the second aluminum part.

In some embodiments, electrically coupling the first interface part of the first copper part to the first aluminum part comprises connecting the first interface part to the first aluminum part with a bolted joint.

In some embodiments, electrically coupling the first interface part of the first copper part to the first aluminum part comprises connecting the first interface part to the first aluminum part by laser welding, ultrasonic welding, or brazing.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DESCRIPTION

In accordance with the present disclosure, it would be advantageous to provide an improved busbar, e.g., a bimetallic busbar, for energy-dense battery modules with component space constraints.

Systems and methods are disclosed herein that provide an improved busbar in a battery module. The bimetallic busbar of the present disclosure may provide one or more of the following mechanical advantages: space saving, cost saving, robustness, and increased performance efficiency. A battery module according to the present disclosure may include a plurality of battery cells, where each battery cell has at least a first and second electrical terminal. The battery module may also include a first busbar. In some embodiments, the battery module may include a second busbar. Each busbar may include an aluminum part, electrically coupled to a respective electrical terminal for each of a group of battery cells, and a copper part. The copper part for each busbar may include an interface part, electrically coupled to the aluminum part of the busbar, and a terminal part, configured to be electrically coupled to a conductor external to the battery module, where the interface part and the terminal part are electrically coupled. It will be understood that the aluminum part may comprise an aluminum alloy and the copper part may comprise a copper alloy.

In some embodiments, the battery module may be a generally rectangular prismatic shape and include a top surface, a side surface, and an edge where the top surface and the side surface meet. The top surface and the side surface are not necessarily solid or flat surfaces. For example, the top surface may include spatial gaps due to space between battery cells encased in the battery module.

In some embodiments, the aluminum part of a busbar in the battery module may include a first dimension that is proximate to the edge and generally extends in a first direction substantially parallel to the edge of the battery module, in an assembled configuration. The aluminum part of the busbar may also include a second dimension that generally extends in a second direction substantially perpendicular to the first direction in a plane that is parallel to the top surface of the battery module, in an assembled configuration. In some embodiments, when a load is electrically coupled to the battery module, current may pass through the second dimension of the aluminum part in a direction perpendicular to (or in some cases, toward) the edge of the battery module. In some embodiments, the aluminum part of the busbar may include a third dimension that extends at least partially along the side surface of the battery module in a direction substantially perpendicular to the first dimension.

In some embodiments, the terminal part of the copper part of the busbar includes a dimension generally perpendicular to the top surface of the battery module. When a load is electrically coupled to the battery module, current may pass through this dimension in a direction generally perpendicular to the top surface of the battery module. Two directions may be generally perpendicular if their intersection forms a 90 degree angle, or if their intersection falls within a range close to 90 degrees, such as a range from 80 to 100 degrees.

In some embodiments, an aluminum part of a busbar in the battery module may include a plurality of extending elements. Each of the plurality of extending elements may be generally parallel to each other. The extending elements may extend along the second dimension of the aluminum part in a direction substantially perpendicular to the edge of the battery module. When a load is electrically coupled to the battery module, current may pass through the plurality of extending elements in the direction generally perpendicular to the edge of the battery module.

In some embodiments, for a busbar in the battery module, the aluminum part is connected to the copper part with a bolted joint. In some embodiments, the aluminum part is connected to the first copper part by laser welding, ultrasonic welding, or brazing.

In some embodiments, the copper part of the busbar may include a dimension that extends at least partially along the side surface of the battery module in a direction perpendicular to the first dimension of the first aluminum part. In some embodiments, the copper part may include an extension surface or element that includes a dimension generally perpendicular to the side surface and connected to the terminal part of the copper part.

In some embodiments, the aluminum part and the copper part of the busbar may be joined or connected near an edge of the battery module, in an assembled configuration. The aluminum part of the busbar may include an aluminum strip that is attached (e.g., by laser welding or another form of electrical coupling) to a copper element of the copper part of the busbar. The copper element may be a strip of copper with the same general width and length of the aluminum strip, but with gaps. Thus, the copper element may be overlaid on top of the aluminum strip and allow for access to the aluminum strip through the gaps in the copper element. The access to the aluminum strip through the gaps may be used to connect (e.g., by laser welding or another form of electrical coupling) the aluminum strip to other aluminum components of the aluminum part of the busbar.

In some embodiments, the terminal part of a first busbar of the battery module may include an electrical high side of the battery module, and the terminal part of a second busbar of the battery module may include an electrical low side of the battery module. In some embodiments, each terminal part of the battery module may be electrically coupled to a respective conductor external to the battery module.

In some embodiments, the battery cells in the battery module may each be coupled, at an end of the battery cell, to a cooling plate (e.g., with an adhesive). In some embodiments, a battery module may include two battery submodules, where each submodule is on an opposite end of a cooling plate.

In some embodiments, a method of manufacturing a battery module is provided. The method may include providing a plurality of battery cells, where each battery cell includes a first and second electrical terminal. The method may further include providing a first busbar, where the first busbar includes an aluminum part and a copper part. The copper part may include an interface part and a terminal part configured to be electrically coupled to a conductor external to the battery module. The method may further include electrically coupling the aluminum part of the first busbar to a group of battery cells at an electrical terminal of each battery cell. The method may further include electrically coupling the interface part of the copper part to the aluminum part. In some embodiments, the method may include providing a second busbar, where the second busbar includes an aluminum part and a copper part that correspond to the aluminum and copper parts described above in relation to the first busbar. The method may further include electrically coupling the aluminum part of the second busbar to a group of battery cells at an electrical terminal of each battery cell. The method may further include electrically coupling the interface part of the copper part to the aluminum part.

In some embodiments, electrically coupling an interface part of the copper part to the aluminum part may include connecting the parts with a bolted joint. In some embodiments, the parts may be connected by laser welding, ultrasonic welding, or brazing. Welded joints may be preferable to bolted joints (which may, e.g., use screws that can vibrate loose or fall out) due to advantageous takt time and reliability. That is, the takt time of a welded joint may be less than that of a bolted joint, which may result in increased production speed and reliability. Additionally, a welded joint may be preferable to a bolted joint due to reduced costs and number of parts. Further, a laser welded connection is lower in electrical resistance than a bolted connection, which may result in a more efficient battery module due to decreased losses to Joule heating.

Figure 1:
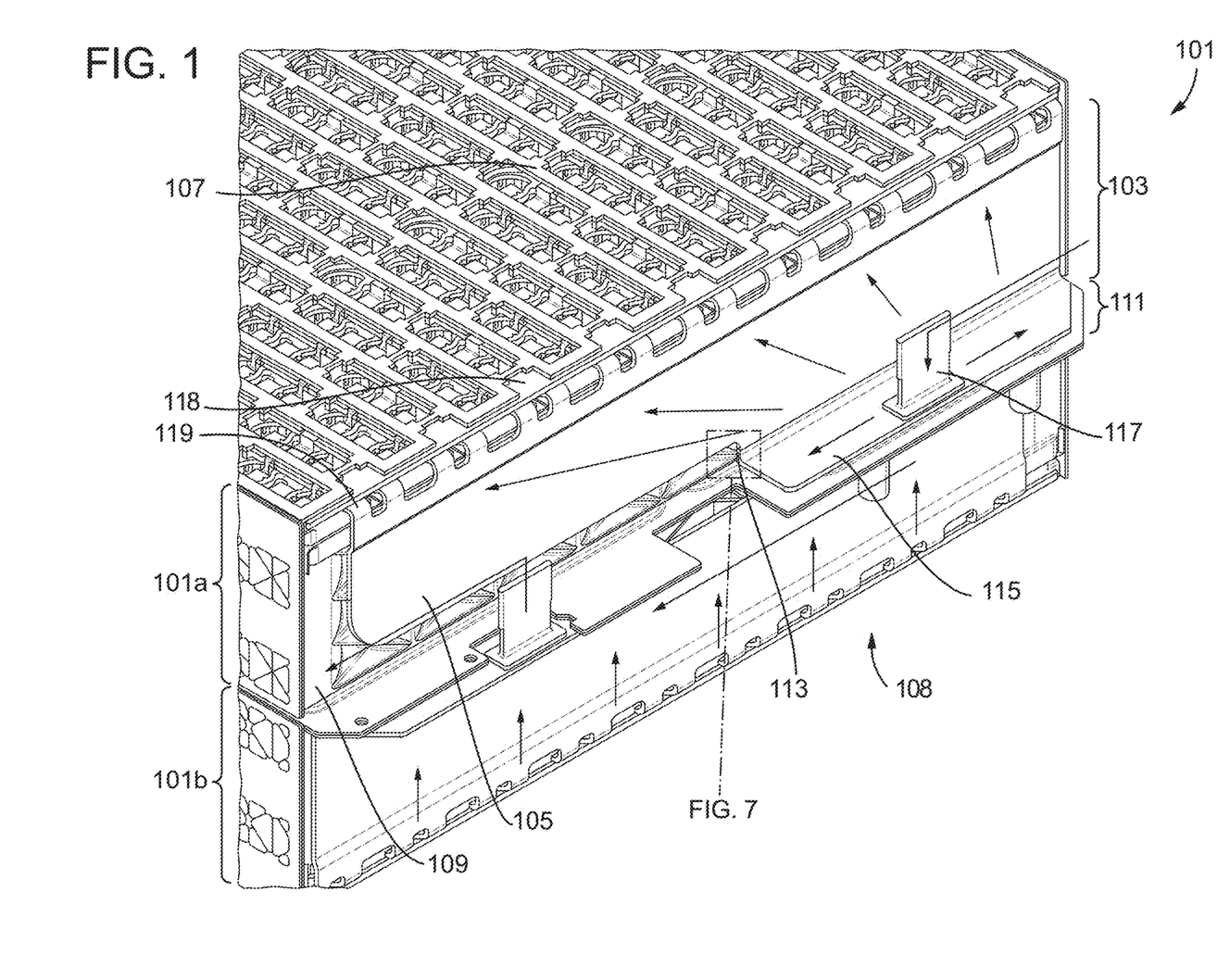
FIG. 1 shows a partial perspective view of an exemplary battery module, in accordance with some embodiments of the present disclosure.
Figure 2:
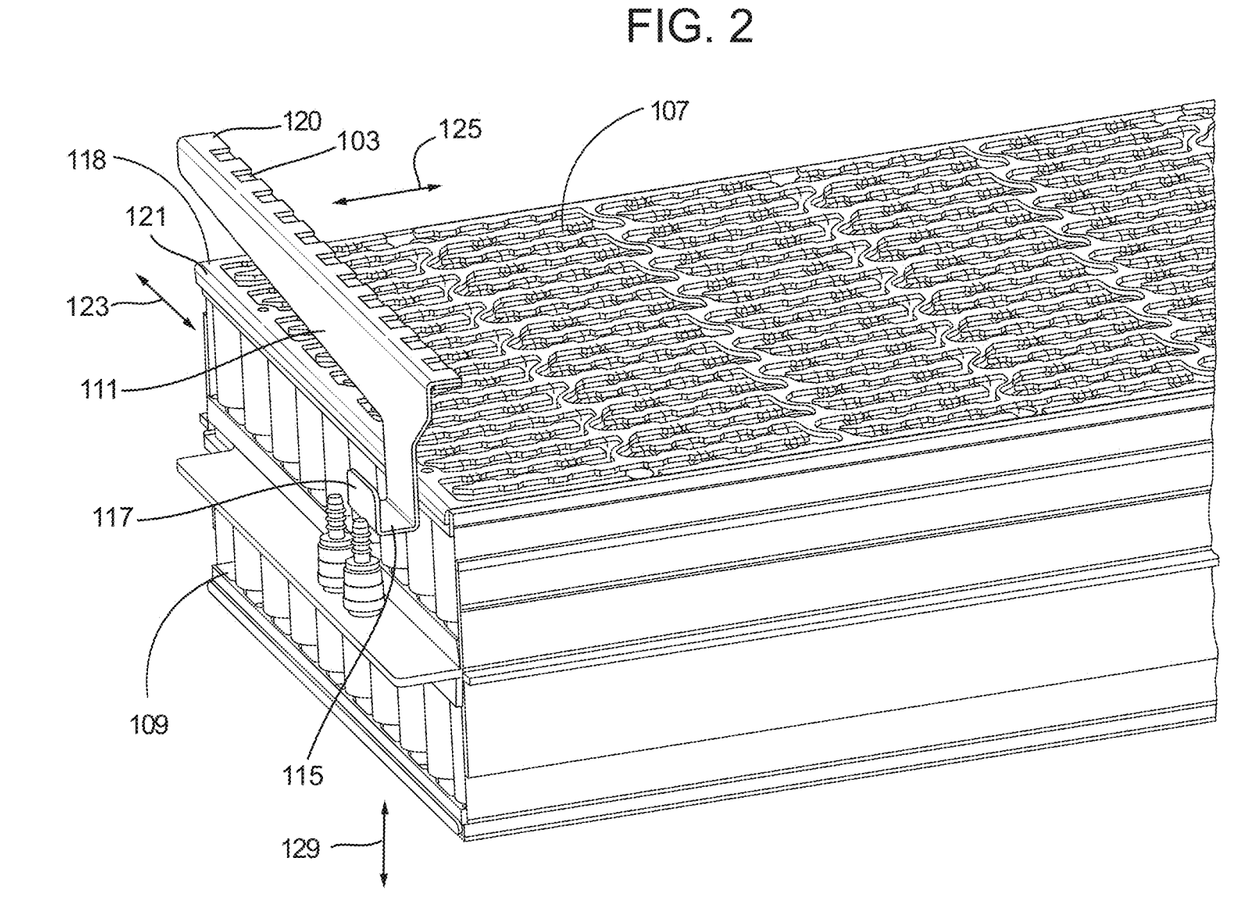
FIG. 2 shows a partial perspective exploded view of an exemplary battery module, in accordance with some embodiments of the present disclosure.

FIG. 1 shows a partial perspective view of an exemplary battery module 101 in accordance with some embodiments of the present disclosure. In FIG. 1, an aluminum part 103 of a busbar 105 includes dimensions on both a top surface 107 and a side surface 109 of the battery module 101. A copper part 111 includes an interface part 113 that connects to the aluminum part 103, an extension 115 that is generally perpendicular to the side surface 109 of the battery module 101, and a terminal part 117 that is generally parallel to the side surface 109 of the battery module 101. The arrows depict an approximation of the current flow through the busbar 105. As shown, current may enter the battery module 101 from an external conductor (e.g., a copper cable) at the terminal part 117, passing through the copper extension 115 and the interface 113, which is an electrical coupling between the copper part 111 and the aluminum part 103, to reach the aluminum part 103. As shown, current continues through the aluminum part 103 in a generally upwards direction (as depicted) along a side surface of the battery module 101 toward an edge 121 of the battery module 101 where the side surface 109 and the top surface 107 of the battery module 101 meet (as shown in FIG. 2). Current may then continue to flow along the top surface 107 of the battery module 101 through extending elements 119 that are electrically coupled to battery cells within the battery module 101, via a connecting busbar 118, which may be made from aluminum. As shown, there may be two submodules 101a, 101b in the battery module 101: a top and a bottom submodule 101a, 101b, where the top submodule 101a is described above. Current may reach a bottom surface 108 of the battery module 101 and, as shown, flow in an upwards direction along the side surface through an aluminum part of the bottom submodule 101b. The current may continue through an aluminum-to-copper interface into a copper extension and a copper terminal of the bottom submodule 101b. Current may then exit the battery module 101 to an external conductor (not shown) through the copper terminal of the bottom submodule 101b. In some embodiments, the top submodule 101a is substantially similar to the bottom submodule 101b. However, it will be understood that the current may flow in opposite directions through the top submodule 101a and the bottom submodule 101b. The current may flow in opposite directions by connecting the opposite battery cell terminals to respective busbars in the submodules 101a, 101b.

Figure 3:
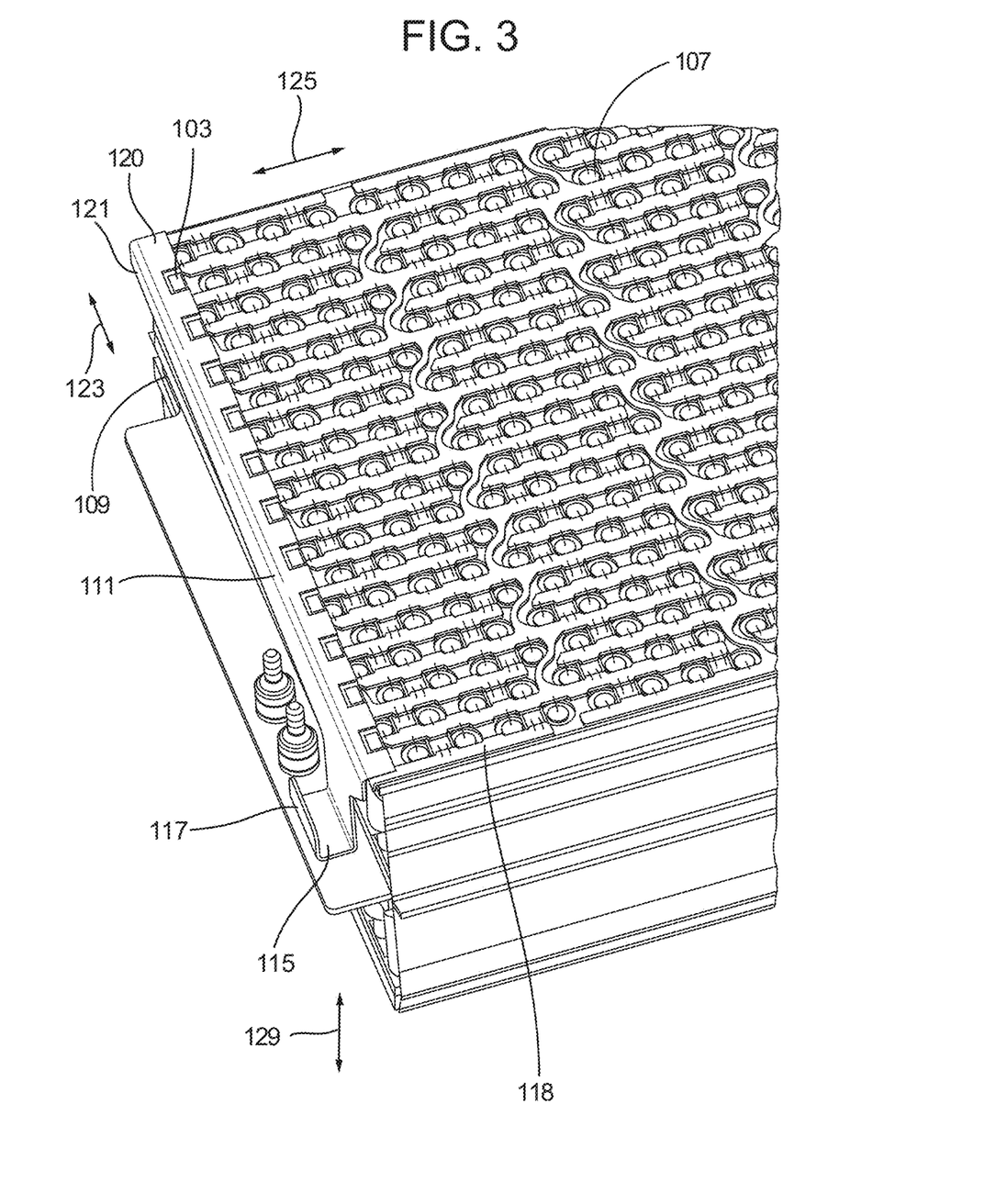
FIG. 3 shows a partial perspective view of an exemplary battery module, in accordance with some embodiments of the present disclosure.

FIGS. 2 and 3 show a battery module 101 in accordance with some embodiments of the present disclosure. FIGS. 2 and 3 show a different configuration of the aluminum part 103 and copper part 111 of the busbar 105 of FIG. 1. In FIGS. 2 and 3, the aluminum part 103 of a busbar 105 includes a first dimension 123 proximate to an edge 121 between the top surface 107 and the side surface 109 and a second dimension 125 that extends along the top surface 107 of the battery module 101 away from the edge 121, in an assembled configuration. The copper part 111 of the busbar 105 includes a dimension 125 along the top surface 107 and a dimension 129 along the side surface 109 of the battery module 101. The copper part 111 includes one or more extending elements 120, similar to the extending elements 119 of the aluminum part 103 shown in FIG. 1, that extend at least along the top surface 107 of the battery module 101. The dimension 129 of the copper part 111 may vary along the dimension 123 of the copper part 111, such that the cross-sectional area of the copper part 111 reduces in the dimension 123 moving away from the terminal part 117. The copper part 111 further comprises an extension 115 that extends away from the side surface 109 and a terminal 117 that extends up from an upper surface of the extension 115 (as depicted).

Figures 4, 5:
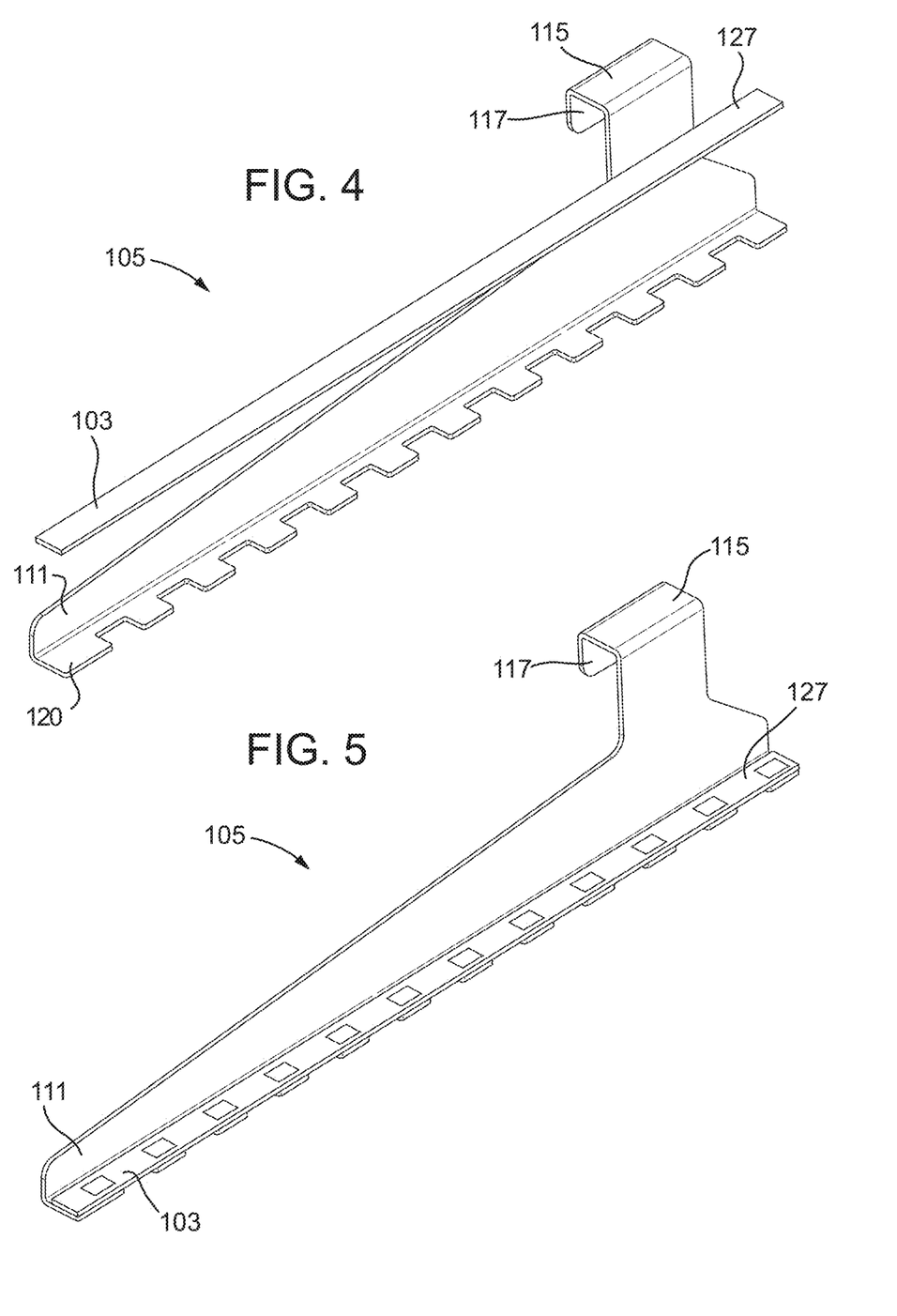
FIG. 4 shows a perspective exploded view of an exemplary busbar, in accordance with some embodiments of the present disclosure.
FIG. 5 shows a perspective view of an exemplary busbar, in accordance with some embodiments of the present disclosure.

FIGS. 4 and 5 show an assembly operation of the busbar 105 of FIGS. 2 and 3, in which the aluminum part 103, which comprises an aluminum strip 127, is coupled to the copper part 111. The busbar 105 may comprise another aluminum part 103, e.g., another aluminum strip 127, assembled to the copper part 111, such that the two aluminum strips 127 sandwich extending elements 120 of the copper part 111. The busbar 105 of FIGS. 4 and 5 may be that depicted in FIGS. 2 and 3 at the edge 121 of the battery module 101 between the top surface 107 and the side surface 109.

Figure 6:
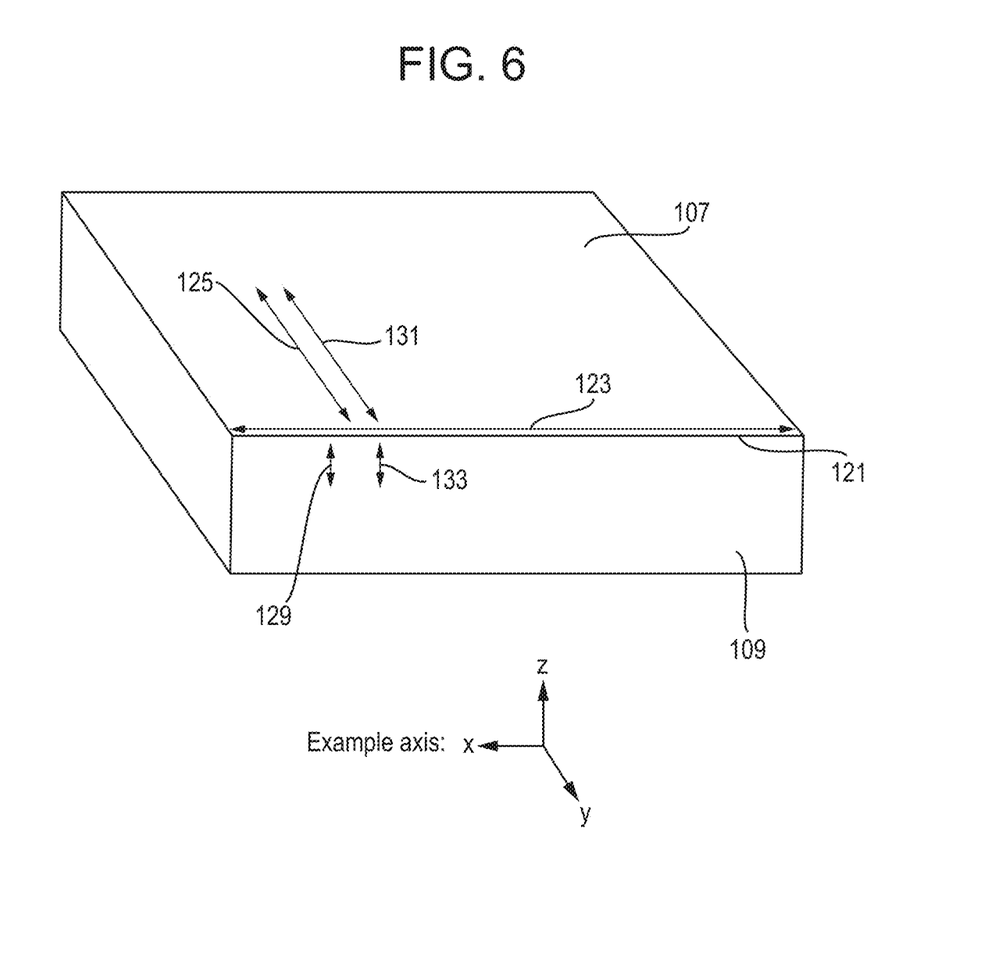
FIG. 6 shows dimensions and surfaces of a battery module, in accordance with some embodiments of the disclosure.

FIG. 6 shows dimensions and surfaces of a battery module 101 in accordance with some embodiments of the disclosure. In some embodiments, the directions of the dimensions may be oriented with an x-axis, y-axis, and z-axis. An example set of axes is shown in FIG. 6.

Terminal busbars of battery modules (i.e., the busbars that convey current into and out of battery modules) may generally convey current predominantly in two directions. A terminal busbar may convey current into the module from an adjacent module, predominantly in a first direction 131 (e.g., a y-direction, with an x-z plane cross-section), e.g., a direction parallel to dimension 125 of the aluminum part 103. The terminal busbar may also deliver current to current collectors of the battery module in a second direction 133 (e.g., a z-direction, with an x-y plane cross-section), e.g., a direction parallel to the second dimension 125 of the aluminum part 103. In some embodiments, the x-y cross section is much larger than the x-z cross section, so it would be advantageous to use a more conductive material (e.g., copper) in the regions that are thermally dominated by the x-z cross-section while maintaining a second material (e.g., aluminum) to act in the x-y cross-section. In some embodiments, the extension 115 of the first copper part 111 may include an x-z plane cross section that conveys current in the y-direction (i.e., into the battery module 101), and the side surface 109 of the battery module 101 may include an x-y plane cross section that conveys current in the third direction 133, e.g., the z-direction (i.e., upward along the side surface 109 of the battery module 101 to the top surface 107). This may necessitate an interface 113 between the two materials of the busbar 105 for current conveyance.

Figure 7:
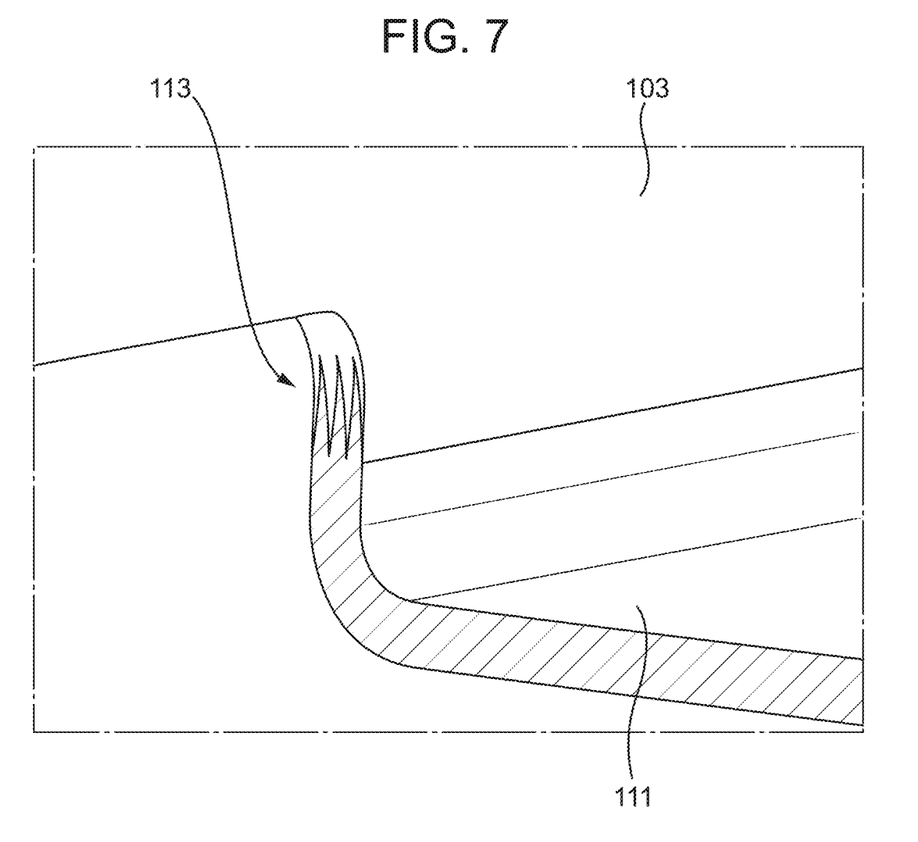
FIG. 7 shows an enlarged partial view of FIG. 1 showing the interface between an aluminum part and a copper part of a busbar of the battery module, in accordance with some embodiments of the disclosure.

FIG. 7 shows an enlarged partial view of FIG. 1 showing the interface 113 between the aluminum part 103 and the copper part 111 of the busbar 105 of the battery module 101. In some embodiments, the interface 113 between the two metals may be formed in a process including very high pressure and heat treatment.

In some embodiments, the terminal part 117 of the copper part 111 of the busbar 105 (also known as a copper tab or a copper interfacing part) may be installed between a high-conductivity region of the terminal busbar (e.g., the extension 115 of the first copper part 111) and an inter-module current conveyance system (e.g., a solid busbar, a layered busbar, a braided strap, a cable, etc.). The terminal part 117 may be installed through a process that includes one or more of the following: laser welding, TIG welding, swaging, and brazing. Thus, the terminal part 117 may be used for both module high-side and module low-side terminal connections. Further, the terminal part 117 may be changed out with relative simplicity and allow for a convenient transition to alternative connection interfaces (e.g., a bolted joint).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

The invention claimed is:

1. A battery comprising:
   a plurality of battery cells, wherein each battery cell comprises an electrical terminal;
   a connecting busbar coupled to the electrical terminals of a group of the plurality of battery cells; and
   a terminal busbar comprising a bimetallic interface that comprises:
   an aluminum part electrically coupled to the connecting busbar; and
   a metallic part comprising:
   an interface part electrically coupled to the aluminum part; and
   a terminal part configured to be electrically coupled to an external conductor.

2. The battery of claim 1, wherein the terminal busbar is a first terminal busbar, the battery further comprising:
   a second terminal busbar comprising:
   an aluminum part electrically coupled to electrical terminals of a second group of the plurality of battery cells; and
   a metallic part comprising:
   an interface part electrically coupled to the aluminum part coupled to the second terminals; and
   a terminal part configured to be electrically coupled to another external conductor.

3. The battery of claim 2, wherein the first terminal busbar comprises an electrical high side of the battery, and wherein the second terminal busbar comprises an electrical low side of the battery.

4. The battery of claim 2, wherein the terminal part of the first terminal busbar is electrically coupled to a first external conductor, and wherein the terminal part of the second terminal busbar is electrically coupled to a second external conductor.

5. The battery of claim 1, wherein:
the battery comprises a generally rectangular prismatic shape comprising a top surface, a side surface, and an edge where the top surface meets the side surface;
the aluminum part comprises:
a first dimension that is proximate to the edge and generally extends in a first direction parallel to the edge of the battery; and
a second dimension that generally extends in a second direction perpendicular to the first direction in a plane that is parallel to the top surface of the battery.

6. The battery of claim 5, wherein the second dimension of the aluminum part comprises a plurality of extending elements that each generally extend in the second direction, and wherein, when a load is electrically coupled to the battery, current passes through the plurality of extending elements in the direction generally perpendicular to the edge of the battery.

7. The battery of claim 5, wherein the aluminum part further comprises a third dimension that extends at least partially along the side surface of the battery in a direction perpendicular to the first dimension of the first aluminum part.

8. The battery of claim 5, wherein the metallic part further comprises a dimension that extends at least partially along the side surface of the battery in a direction perpendicular to the first dimension of the aluminum part.

9. The battery of claim 8, wherein the dimension of the metallic part that extends along the side surface comprises a section having a width in the first dimension that decreases as a distance away from the edge increases.

10. The battery of claim 5, wherein the metallic part further comprises a first extension comprising a dimension generally perpendicular to the side surface and connected to the terminal part.

11. The battery module of claim 5, wherein the aluminum part comprises an aluminum strip, and wherein the interface part comprises a copper strip with access windows through which the aluminum strip and the plurality of extending elements are configured to be electrically coupled.

12. The battery of claim 11, wherein the aluminum strip and the plurality of extending elements are electrically coupled by laser welding.

13. The battery of claim 1, wherein the aluminum part is connected to the metallic part with a bolted joint.

14. The battery of claim 1, wherein the aluminum part is connected to the metallic part by laser welding, ultrasonic welding, or brazing.

15. The battery of claim 1, wherein each of the plurality of battery cells is coupled at an end of the cell to a cooling plate.

16. The battery of claim 1, wherein a first group of the plurality of battery cells is coupled to a first side of the cooling plate and a second group of the plurality of battery cells is coupled to a second opposite side of the cooling plate.

17. A method of manufacturing a battery, the method comprising:
providing a plurality of battery cells, wherein each battery cell comprises an electrical terminal;
providing a connecting busbar;
coupling the connecting busbar to the first electrical terminals of a group of the plurality of battery cells;
providing a terminal busbar comprising a bimetallic interface that comprises:
an aluminum part; and
a metallic part comprising:
an interface part; and
a terminal part configured to be electrically coupled to an external conductor;
electrically coupling the aluminum part to the connecting busbar; and
electrically coupling the interface part to the aluminum part.

18. The method of claim 17, wherein the terminal busbar is a further terminal busbar, the method further comprising:
providing a second terminal busbar comprising:
an aluminum part; and
a metallic part comprising:
an interface part; and
a terminal part configured to be electrically coupled to another external conductor;
electrically coupling the aluminum part of the second terminal busbar to the electrical terminals of a different group of the plurality of battery cells; and
electrically coupling the interface part of the second terminal busbar to the aluminum part of the second terminal busbar.

19. The method of claim 17, wherein electrically coupling the interface part of the metallic part to the aluminum part comprises connecting the interface part to the aluminum part with a bolted joint.

20. The method of claim 17, wherein electrically coupling the interface part of the metallic part to the aluminum part comprises connecting the interface part to the aluminum part by laser welding, ultrasonic welding, or brazing.

21. The battery of claim 1, wherein the connecting busbar is comprised of a continuous plate with a plurality of features structured to be coupled to the electrical terminals of the first group of the plurality of battery cells.

22. The battery of claim 5, wherein:
when a load is electrically coupled to the battery, current passes through the second dimension of the aluminum part in a direction generally perpendicular to the edge of the battery;
the terminal part comprises a dimension generally perpendicular to the top surface of the battery; and
when a load is electrically coupled to the battery, current passes through the dimension of the terminal part in a direction generally perpendicular to the top surface of the battery.

* * * * *